(12) United States Patent
Tsumura

(10) Patent No.: US 6,411,821 B1
(45) Date of Patent: Jun. 25, 2002

(54) TELEPHONE REGULATION SYSTEM AND PORTABLE TELEPHONE TERMINAL DEVICE USED IN SUCH A SYSTEM

(75) Inventor: Toshihiro Tsumura, Osaka (JP)

(73) Assignee: Tsumura Research Institute Co., Osaka (JP)

( * ) Notice: Subject to any disclaimer, the term of this patent is extended or adjusted under 35 U.S.C. 154(b) by 0 days.

(21) Appl. No.: 09/645,351

(22) Filed: Aug. 25, 2000

(30) Foreign Application Priority Data

Sep. 6, 1999 (JP) .......................................... 11-252172

(51) Int. Cl.⁷ .............................. H04B 1/38; H04M 1/00
(52) U.S. Cl. ........................ 455/553; 455/418; 455/575; 455/63
(58) Field of Search .............................. 455/421, 229.1, 455/422, 517, 63, 575, 67.7, 103, 69, 553, 418, 419, 420, 101, 132, 133, 413; 359/145, 146

(56) References Cited

U.S. PATENT DOCUMENTS

| 5,241,410 A |   | 8/1993 | Streck et al. ............... 359/176 |
| 5,479,595 A | * | 12/1995 | Israelsson .................... 359/145 |
| 5,628,052 A | * | 5/1997 | DeSantis .................... 455/33.3 |
| 6,052,577 A | * | 4/2000 | Taguchi ...................... 455/411 |
| 6,160,995 A | * | 12/2000 | Kiswani .................... 455/31.2 |

FOREIGN PATENT DOCUMENTS

| EP | 0880296 A1 | 11/1998 |
| WO | WO 97/36442 | 10/1997 |
| WO | WO 98/54921 | 12/1998 |
| WO | WO 00/04732 | 1/2000 |

OTHER PUBLICATIONS

European Search Report dated Dec. 19, 2000.
XP 000680926, Nov. 01, 1996.

* cited by examiner

Primary Examiner—Vivian Chang
Assistant Examiner—James K Moore
(74) Attorney, Agent, or Firm—McDermott, Will & Emery

(57) ABSTRACT

A telephone regulation system to regulate usage of a telephone terminal that carries out conversation using a radio wave includes an approach recognition device provided at the neighborhood of an approach path to a predetermined region to transmit a first command through a weak wave to a portable telephone terminal passing through the neighborhood and entering the predetermined region, and a departure recognition device provided in the neighborhood of a departure path from the predetermined region to transmit a second command through a weak wave to a telephone terminal passing through the neighborhood and departing from the predetermined region.

2 Claims, 15 Drawing Sheets

TELEPHONE REGULATION SYSTEM AND PORTABLE TELEPHONE TERMINAL DEVICE USED IN SUCH A SYSTEM

BACKGROUND OF THE INVENTION

1. Field of the Invention

The present invention relates to a system to regulate usage of the portable telephone in public, particularly to a system that regulates communication using radio waves that may adversely affect the human body in public.

2. Description of the Background Art

The use of portable telephones has exploded in the past several years because of the reduction in size of devices due to the advance in electronic technology, the development of infrastructure for wireless telephone communication in cities and in other areas, and the change in the life style of the youth. The number of portable telephones used in Japan is now substantially equal to or more than the number of the conventional fixed type telephone sets. Some pay stations that are scarcely used have been removed corresponding to the spread of such portable telephones.

In accordance with the spread of portable telephones, the problem of the undesirable effect caused by radio waves used as the communication media for the portable phones is noteworthy. Although it is not yet concluded that radio waves of the intensity level employed for portable telephones definitely and adversely affect the human body, the possibility cannot be denied. Furthermore, attention is focused on the problem that the radio waves employed in portable phones will adversely affect other electronic equipment.

A typical example is the problem that a pacemaker embedded in the heart of a human being suffering from arrhythmia, for example, may stop or go out of control due to the radio waves of portable phones. Such an accident would be a serious problem immediately affecting one's life. This problem will be more serious when people of various conditions are extremely close to each other physically such as in a crowded train or the like.

In hospitals, aircrafts or in any places where many pieces of electronic equipment are used, erroneous operation of the electronic devices may be caused by the radio waves of portable telephones. Erroneous operation of such devices used in treatment and diagnosis in hospitals will affect a man's life as in the case of the pacemaker. In the case of an aircraft, erroneous operation of the avionics equipment may jeopardize the lives of many people. Such problems must be solved urgently before portable telephones and electronic equipment are further spread in the society.

The problems caused by portable telephones are not limited to those related to electronic equipment. For example, in cinemas, theaters, concert halls and the like, the ring of a portable telephone from the audience during performance will spoil the atmosphere and annoy the people in the neighborhood. At the current stage, notice is made to switch off the portable telephone prior to performance at such places. However, the event of a portable phone ringing from the audience during performance is still encountered. There is a demand to solve such problems.

There are some facilities such as concert halls where acoustic effects are critical that have a noise wave emitted internally to disable reception of a portable telephone call in order to solve such a problem. In this case, the advantageous use of a portable phone such as achieving contact with a target party immediately will be lost. The need arises for the art to suppress the undesirable affect to one's surroundings while making good use of the merit of the portable telephone.

SUMMARY OF THE INVENTION

In view of the foregoing, an object of the present invention is to provide a telephone regulation system to regulate usage of a portable telephone and a portable telephone device employed in such a system so that one's surroundings are not adversely affected.

Another object of the present invention is to provide a telephone regulation system to regulate usage of a portable telephone and a portable telephone device used in such a system, making good use of the merit of the portable telephone without adversely affecting one's surroundings.

A telephone regulation system according to the present invention regulates the usage of a telephone terminal that effects conversation through radio waves. Each telephone terminal has the function to disable communication by radio waves upon receiving a predetermined first command through radio communication, and to enable communication through radio waves upon receiving a predetermined second command through radio communication. The telephone regulation system includes an approach recognition device provided in the neighborhood of an approach path to a predetermined region to transmit a first command through a weak wave to a telephone terminal passing the neighborhood thereof and entering the predetermined region, and a departure recognition device provided in the neighborhood of a departure path from the predetermined region to transmit a second command through a weak wave to the telephone terminal passing the neighborhood thereof and departing from the predetermined region.

When a telephone terminal enters the predetermined region, the first command is transmitted from the approach recognition device to the telephone terminal, whereby the telephone terminal disables communication through radio waves. Accordingly, communication by the telephone terminal using radio waves is regulated in the predetermined region. When the telephone terminal departs from the predetermined region, the second command is transmitted from the departure recognition device to the telephone terminal, whereby the telephone terminal enables communication through radio waves. Accordingly, the general conversation through radio waves is allowed outside the predetermined region. Since radio waves are not used within the predetermined region for communication, the possibility of adversely affecting electronic equipment or providing an unpreferable effect on the human being is low.

Preferably, each of the approach recognition device and the departure recognition device has the function to obtain a telephone number of the telephone terminal by communication with the telephone terminal passing the neighborhood by a weak wave. The telephone regulation system further includes a storage device to store the telephone number, and a manager circuit to govern the telephone number stored in the storage device according to the telephone number transmitted from the approach recognition device and the departure recognition device.

Since the telephone number of a telephone terminal located within a predetermined region can be governed by the manager circuit, the telephone terminal present within the predetermined region can be identified.

Further preferably, the telephone regulation system includes a call sense device to sense a call to a telephone terminal by an external radio wave, a match detection circuit connected to the storage device and the call sense device to detect whether the telephone number included in the call sensed by the call sense device matches the telephone number stored in the storage device, a calling device to call within a predetermined region the telephone number stored in the storage device corresponding to the detection of a match with the telephone number included in the call by the match detection circuit, and a call relay device to relay conversation between the telephone terminal responding to the call by the calling device and the telephone terminal issuing the call sensed by the call sense device.

When a call from an external source is issued with respect to the telephone number stored in the storage device, a call is issued to the relevant telephone number in the predetermined region. Conversation can be carried out if the telephone terminal responds to the call. Therefore, good use can be made of a telephone terminal as communication means.

Further preferably, each telephone terminal includes a device to switch among the function of carrying out conversation through optical communication, the function of carrying out communication through optical communication in response to a first or second command, and the function of carrying out communication by the general radio wave. The telephone regulation system further includes an optical communication device provided within the predetermined region to carry out optical communication with a telephone terminal. The calling device includes a device to effect a call towards a telephone terminal through optical communication using the optical communication device.

A call can be placed within the predetermined region through optical communication. The problem of adversely affecting electronic equipment and the like is suppressed since the call is not carried out using a strong wave.

According to another aspect of the present invention, a telephone regulation system regulates usage of a telephone terminal that carries out conversation through radio waves. The telephone regulation system includes a plurality of telephone terminals. Each telephone terminal has the function to disable communication through radio waves upon receiving a predetermined first command. The telephone regulation system further includes an approach recognition device provided in the neighborhood of an approach path to a predetermined region to transmit a first command through a weak wave to a telephone terminal passing the neighborhood and approaching the predetermined region. Accordingly, conversation using radio waves by a telephone terminal is regulated in the predetermined region.

When a person with a telephone terminal enters a predetermined region, the first command is transmitted from the approach recognition device through a weak wave. Conversation by the telephone terminal through radio waves is disabled in response to this first command. Therefore, the adverse affect on electronic equipment by radio waves of the telephone terminal can be prevented in the predetermined region.

According to a further aspect of the present invention, a portable telephone terminal device includes a first communication device to carry out communication through a radio wave, a second communication device to carry out communication using light, a telephone set device, and a switch device to selectively couple the first communication device or the second communication device with the unit of the telephone set in response to the command received through the first communication device.

Upon receiving a command via the first communication device, automatic switching between communication through radio waves and communication through light is allowed. The user can use the appropriate conversation scheme without particularly being aware of what medium is employed for telephone communication at the site where the user is currently located.

According to still another aspect of the present invention, a portable telephone terminal device includes a telephone set circuit, a radio communication device, an optical communication device, and a communication interface selectively coupling one of the radio communication device and optical communication device with the telephone set circuit in response to a command received via the radio communication device.

According to a still further aspect of the present invention, a method of regulating conversation by a portable telephone includes the steps of maintaining a table of a telephone number of a portable telephone set present within a second region in a storage device by communicating through a weak wave with a portable telephone set passing the boundary between first and second regions, the portable telephone set being capable of communication by radio and communication by light, determining whether a telephone number corresponding to a call is stored in the storage device by searching the storage device in response to the call towards a portable telephone through external radio communication, calling a portable telephone set of the telephone number corresponding to the call in the second region using an optical communication device provided in the second region in response to determination of a telephone number corresponding to the call stored in the storage device, and relaying the call to the responding terminal telephone set in the second region in response to the response from the portable telephone set.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Application of a portable telephone regulation system according to a first embodiment of the present invention to a vehicle of a train will be described hereinafter. It is apparent to those skilled in the art that the present system is not limited to a train, and is applicable to places where many people assemble or where silence is desired such as inside a bus, an aircraft, a boat or a ship, hospitals, concert halls, theaters, cinemas, museums, galleries, aquariums, libraries, schools, gymnasiums, lecture halls, department stores, crowded platforms, and at street corners where many people are waiting for stoplights to change.

Figure 1:
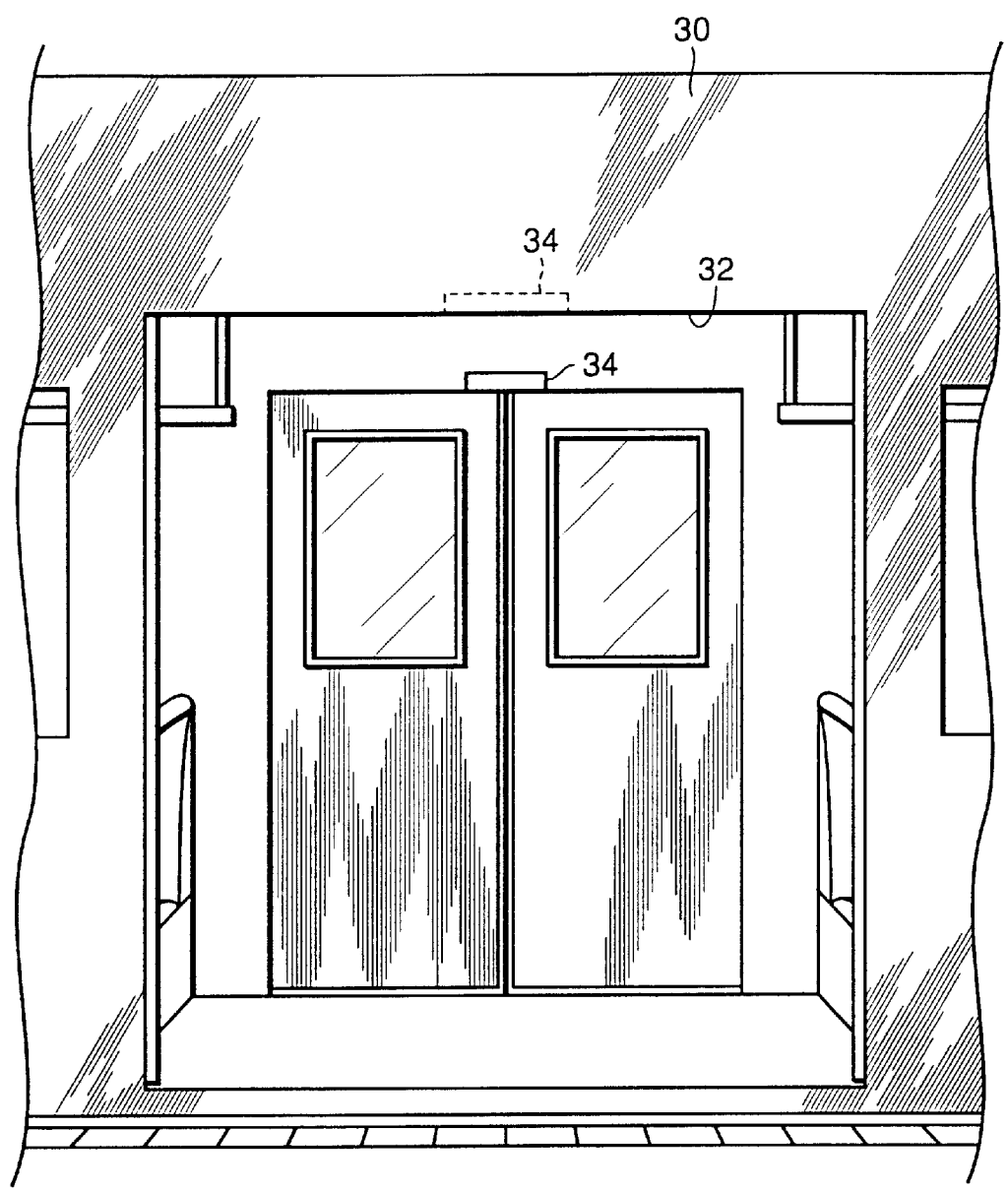
FIG. 1 is a partial side view of a vehicle of a train mounted with a telephone regulation system according to a first embodiment of the present invention.

Referring to FIG. 1, the present system includes an approach recognition device 34 provided, for example, above a door opening 32 of a vehicle 30 where passengers get on/off that senses a person with a portable telephone boarding vehicle 30. By the information obtained through approach recognition device 34, control is provided so that the portable telephone is inhibited of communication through radio waves in vehicle 30, and so that the portable telephone in vehicle 30 can carry out communication with an external source through communication using light that does not adversely affect the surroundings. The structure thereof will be described in detail hereinafter.

Figure 2:
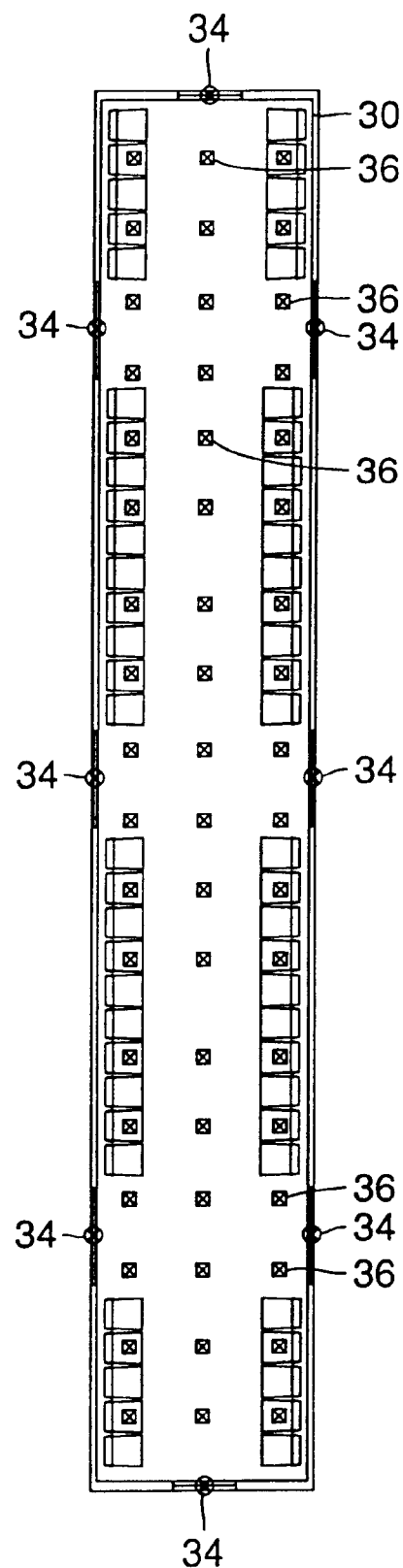
FIG. 2 is a plan view of a vehicle of a train mounted with the telephone regulation system of the first embodiment.

Referring to FIG. 2, the system of the first embodiment has an approach recognition device 34 provided at each door opening 32 of vehicle 30 and also at the passage opening with the preceding and succeeding vehicles. All approach recognition devices 34 are under control of the onboard system provided in vehicle 30. This system includes a plurality of optical communication devices 36 provided at the ceiling of vehicle 30. Each optical communication device 36 serves to allow communication with a portable telephone through optical communication using infrared.

Figure 3A:
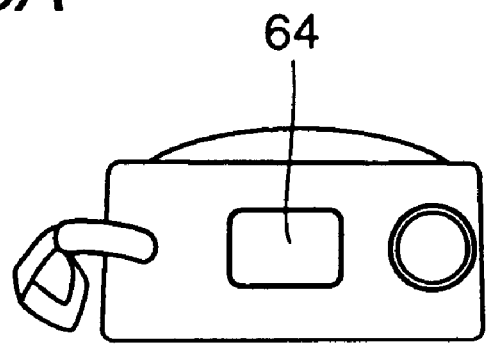
FIGS. 3A and 3B are a plan view and a front view, respectively, of a portable telephone according to the first embodiment.
Figure 3B:
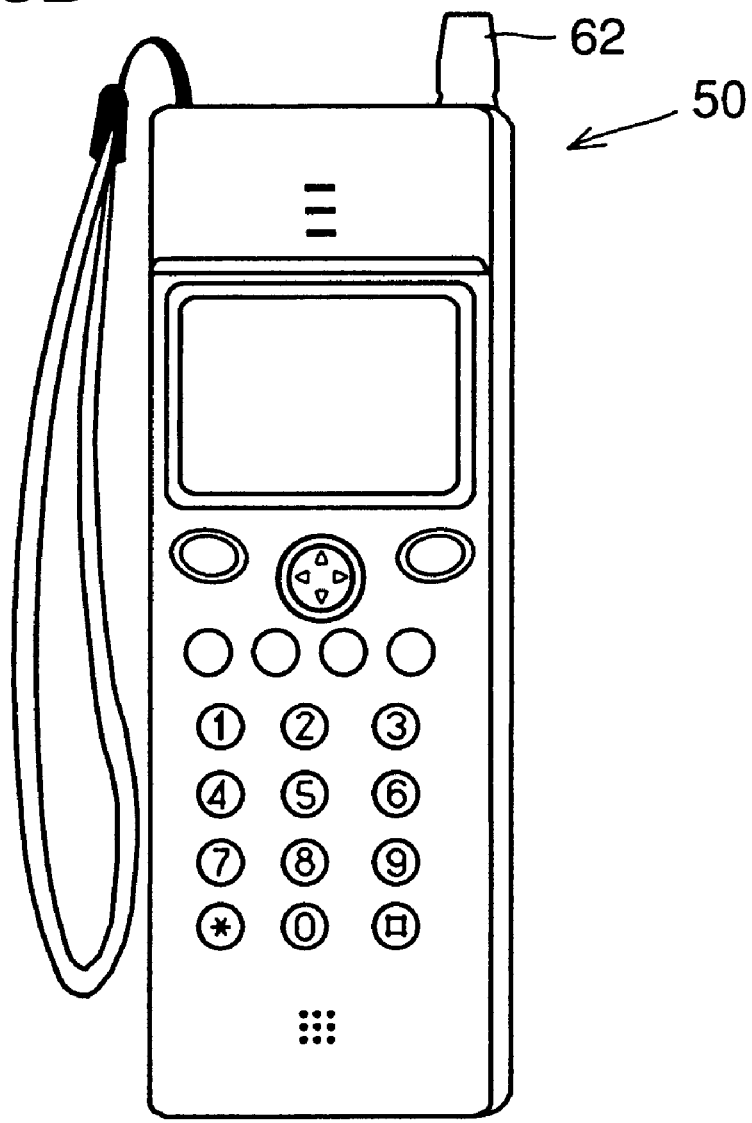

Referring to FIGS. 3A and 3B, a portable telephone set 50 used in the present system includes an antenna 62 to effect communication through radio as in the conventional case, and also an optical communication device 64 to carry out communication with optical communication device 36 using light as the medium. A further detailed functional block of portable telephone set 50 will be described afterwards.

Figure 4:
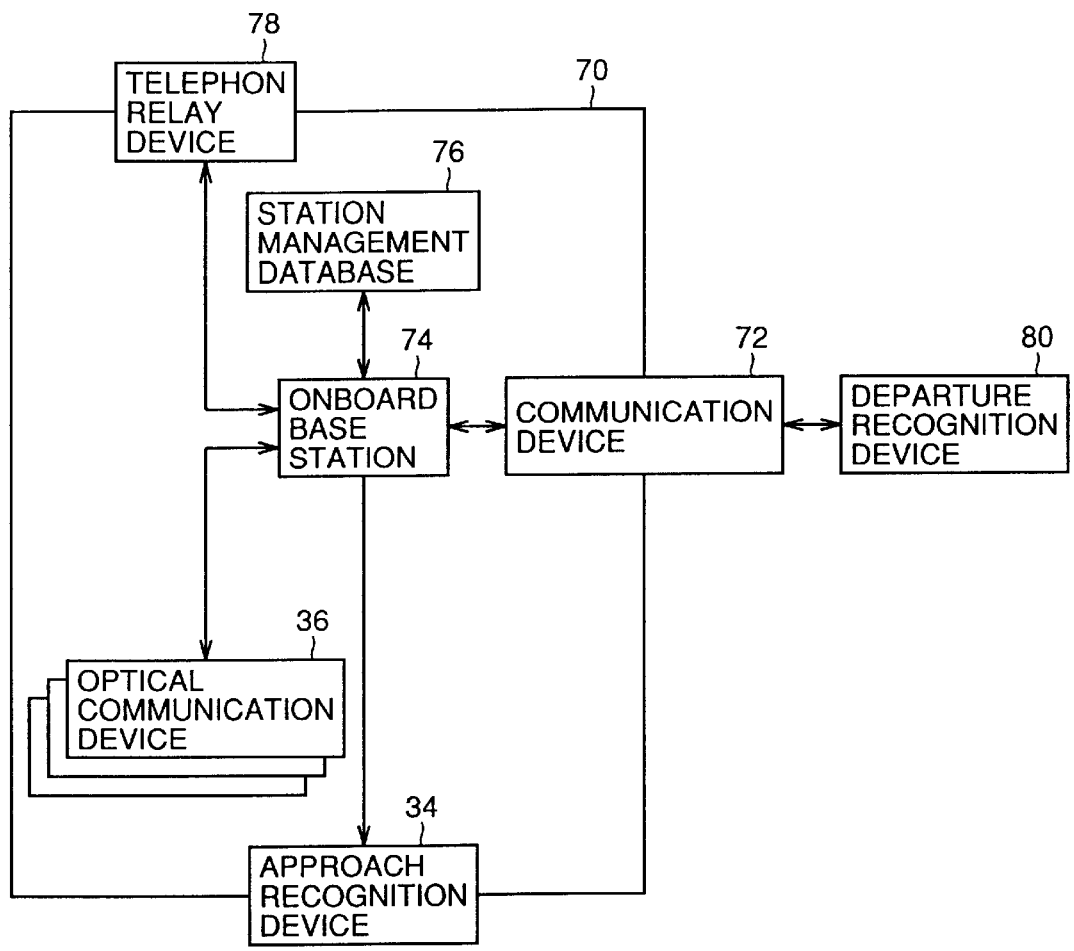
FIG. 4 is a block diagram of a portion of the telephone regulation system of the first embodiment mounted on a vehicle.

Referring to FIG. 4, the telephone regulation system of the first embodiment includes an approach recognition device 34 provided above respective doors of a train commanding a portable telephone to switch to a communication mode employing optical communication instead of radio waves when a passenger carrying a portable phone gets on the train through the door, an onboard system 70 provided for each vehicle of the train to effect telephone conversation between a portable telephone in the vehicle and an external source through optical communication device 36, and a departure recognition device 80 provided in the neighborhood of the door of the vehicle to the platform to provide a command so as to switch the optical communication mode of the portable telephone carried by the passenger getting off the train to a communication mode through the general radio waves.

Onboard system 70 includes a station management database 76 to store information such as telephone numbers of portable telephones present in the vehicle under control of onboard system 70, an onboard base station 74 to update and govern the information in station management database 76 according to information from approach recognition device 34 and departure recognition device 80, a telephone relay device 78 for onboard base station 74 to carry out communication through radio with an external telephone, a communication device 72 to mediate communication between departure recognition device 80 and onboard base station 74 by radio, and a plurality of optical communication devices 36 mentioned already for onboard base station 74 to carry out communication with a portable telephone in the relevant vehicle through light.

Figure 5:
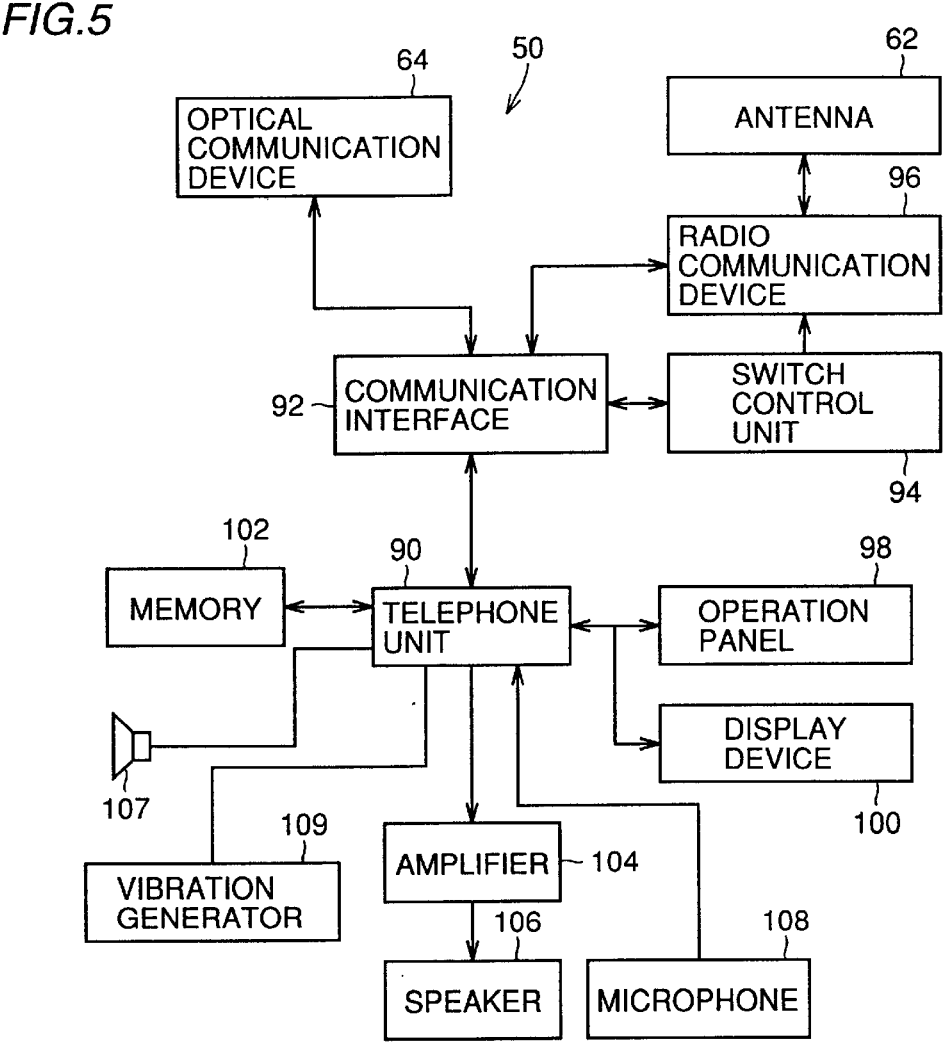
FIG. 5 is a block diagram of a portable telephone used in the system of the first embodiment.

Referring to FIG. 5, portable telephone set 50 used in the present system includes an antenna 62 and a radio communication device 96 to carry out normal telephone communication through radio, an optical communication device 64 to carry out optical communication, a communication interface 92 connected to radio communication device 96 and optical communication device 64 to select either thereof, a switch control unit 94 connected to radio communication device 96 and communication interface 92 to control communication interface 92 so as to select optical communication device 64 and radio communication device 96 when the signal received via radio communication device 96 is from approach recognition device 34 and from departure recognition device 80, respectively, a telephone unit 90 connected to communication interface 92 to carry out communication using optical communication device 64 or radio communication device 96, a memory 102 used by telephone unit 90, that stores information of telephone numbers and the like, an operation panel 98 and a display 100 connected to telephone unit 90, a microphone 108, an amplifier 104 and a speaker 106 connected to telephone unit 90 for the usage of the general telephone, a buzzer to notify an incoming call by sound, and a vibration generation device 109 to notify an incoming call by vibration.

Figure 6:
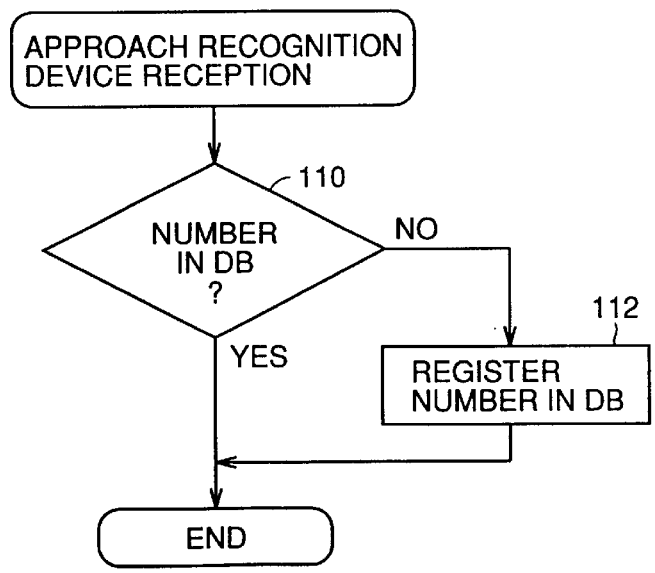
FIG. 6 is a flow chart of a process of approach recognition device reception carried out by the onboard system of the first embodiment.

Onboard base station 74 shown in FIG. 4 is implemented by a microprocessor and a program executed by the microprocessor. Referring to FIG. 6, the program of onboard base station 74 of onboard system 70 has a control configuration as set forth in the following. Upon receiving a message or a communication from departure recognition device 80 via communication device 72, from an external source via telephone relay device 78, from approach recognition device 34, and from a portable telephone present in the vehicle via optical communication device 36, a program corresponding to the type of the received message or communication is operated in onboard base station 74.

Referring to FIG. 6, upon receiving a message including the telephone number of the portable telephone carried by the passenger that is boarding from approach recognition device 34, onboard base station 74 looks into station management database 76 to determine whether the telephone number is recorded in station management database 76 (110). If that telephone number is not recorded in station management database 76, onboard base station 74 registers this number in station management database 76 (112), and ends the process. When the telephone number is already recorded in station management database 76, nothing is carried out, and the process ends.

By the process shown in FIG. 6, the telephone number of a portable telephone carried by a passenger boarding the vehicle is recorded in station management database 76.

Figure 7:
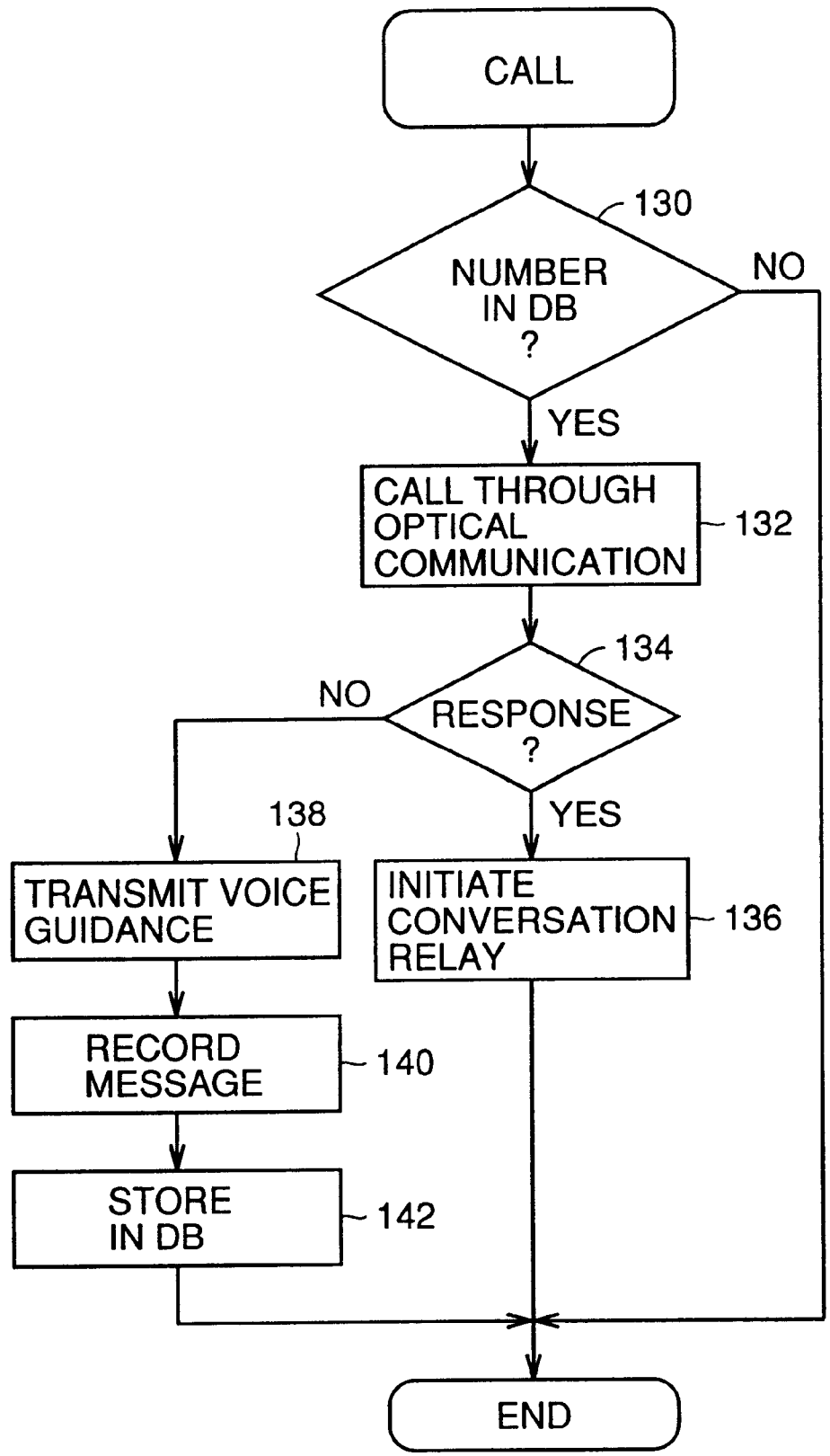
FIG. 7 is a flow chart of a process of general call reception carried out by the onboard system of the first embodiment.

The operation of onboard base station 74 when an external call is issued to a portable telephone will be described with reference to FIG. 7. First, determination is made whether the portable telephone number included in the calling signal is recorded in station management database 76 or not (130). If this number is not recorded in station management database 76, no process is carried out since this call is not directed to a portable telephone present in that vehicle.

When the portable telephone number included in the calling signal is found in station management database 76, onboard base station 74 issues a calling signal towards the portable telephone by optical communication (step 132) using optical communication device 36 in the vehicle. Determination is made whether there is a response from the relevant portable telephone corresponding to this calling signal (134). If there is a response, relay of the communication between an external telephone and the portable telephone in the vehicle is initiated via telephone relay device 78, onboard base station 74 and optical communication device 36 (136). Then the process ends.

When determination is made that there is no response with respect to the call at step 134, the case where the relevant portable telephone is left in the baggage, for example, can be considered. In this case, an operation such as of an automatic answering device (the so-called answer phone) is to be carried out. More specifically, a predetermined voice guidance notifying that a message can be left is synthesized and transmitted to the calling station via telephone relay device 78 (138). When a message is transmitted from the calling station in response to this guidance (generally, voice message), this message is digitally recorded (140), and data-compressed to be stored in station management database 76 in association with the telephone number (142). When the recording and storing operation of the message ends, the line is disconnected, and the process ends.

Figure 8:
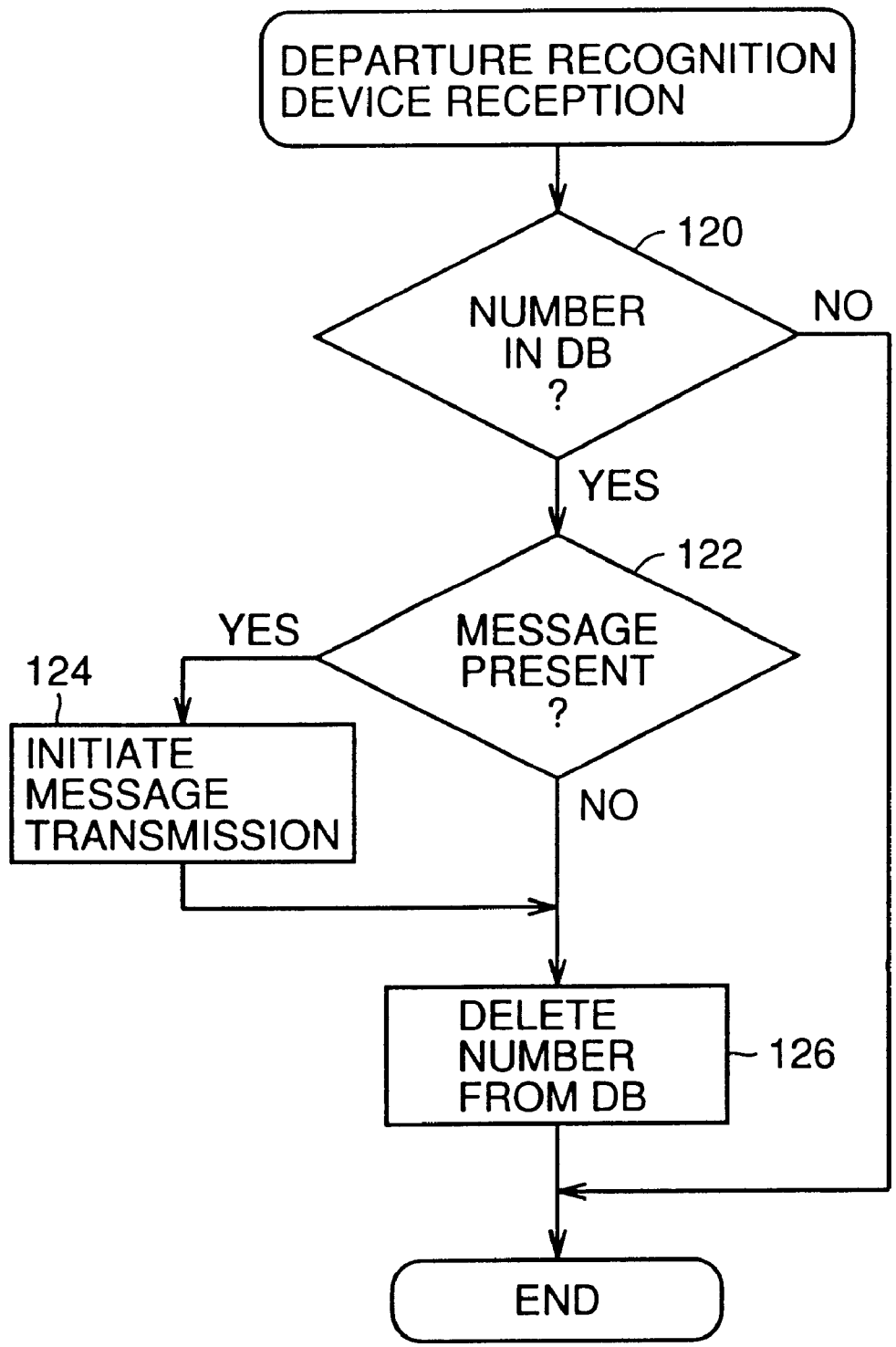
FIG. 8 is a flow chart of a process of departure recognition device reception carried out by the onboard system of the first embodiment.

A process as shown in FIG. 8 is carried out when the received message is from departure recognition device 80. It is assumed that the telephone number of the portable telephone communicating with departure recognition device 80 is transmitted as a message to onboard base station 74 via communication device 72 from departure recognition device 80.

First, determination is made whether the transmitted telephone number is recorded in station management database 76 (120). If not recorded, the process immediately ends. If the number is recorded, determination is made whether there is a message recorded at step 140 of FIG. 7 with respect to this telephone number (122). If there is no message left, this number is deleted from station management database 76 (126), and the process ends. When determination is made that a message corresponding to this telephone number is recorded in station management database 76 at step 122, the portable telephone of the relevant number is called via telephone relay device 78. A process to transmit the recorded message is initiated (124). At step 126 following step 124, the relevant telephone number is deleted from station management database 76, and the process ends.

According to the foregoing process, the exit of a passenger carrying a portable telephone is sensed by departure recognition device 80, and station management database 76 is updated by onboard base station 74 receiving that message. The portable telephone of that passenger receives a command to switch to the communication mode by radio from departure recognition device 80. Therefore, the portable telephone is switched from the optical communication mode in the vehicle to the normal radio communication mode so as to be used as a normal portable telephone.

Figure 9:
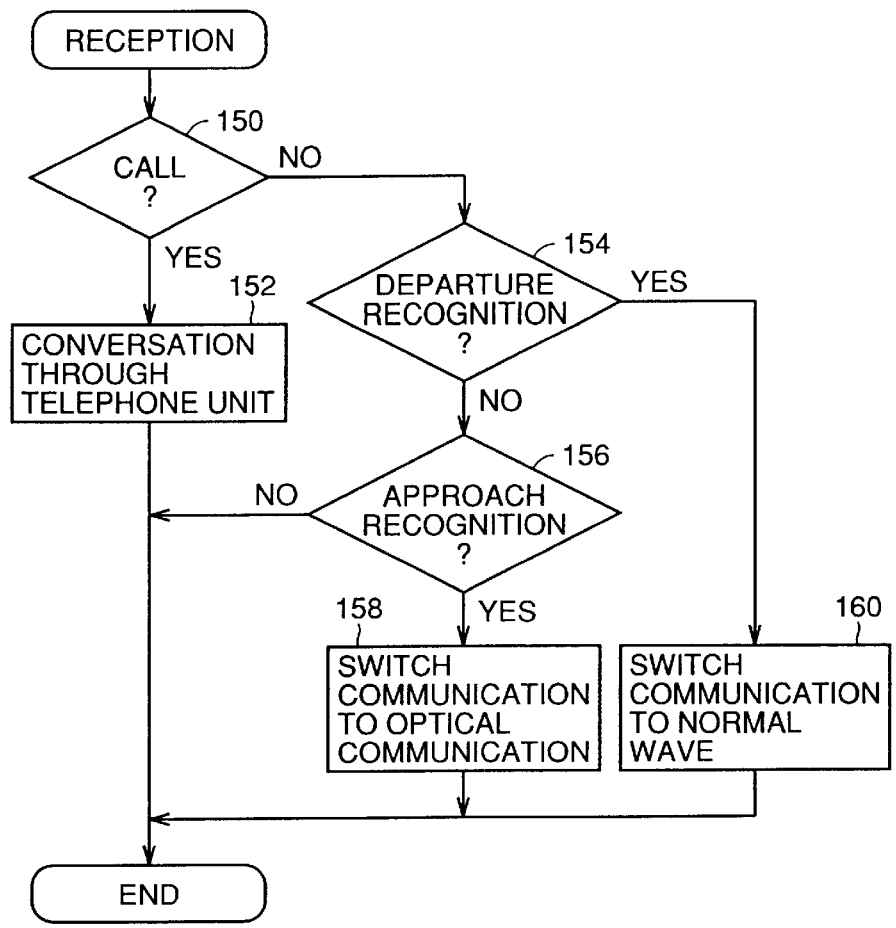
FIG. 9 is a flow chart of a communication process carried out by a portable telephone used in the system of the first embodiment.

The process carried out by switch control unit 94 of portable telephone set 50 will be described with reference to FIG. 9. The process shown in FIG. 9 is actuated when a message or communication is received. First, determination is made whether the message or communication that has triggered this process is a normal call or not (150). When determination is made that this communication is a normal call at step 150, the conversation process by telephone unit 90 is initiated (152), and the process ends. At this stage, either radio communication device 96 or optical communication device 64 is coupled to communication interface 92 by the function of switch control unit 94. Telephone communication is carried out by portable telephone set 50 via communication interface 92. Communication interface 92 conceals the difference in the communication scheme. Therefore, the communication process per se carried out by telephone unit 90 is identical in optical communication and radio communication. As to this normal call, a calling operation using a buzzer 107 or a vibration generation device 109 is carried out. In the operation through the normal radio waves, the usage of either buzzer 107 or vibration generation device 109 corresponds to the setting made in advance by the user. In the operation through optical communication, usage of vibration generation device 109 is selected irrespective of the presetting of the user.

When determination is made that the call is not the normal call as a result of step 150, control proceeds to step 154 to determine whether the message or the communication is a command to switch the communication mode from departure recognition device 80. In the case of a communication mode switch command from departure recognition device 80, switch control unit 94 couples communication interface 92 with radio communication device 96, and the communication mode of portable telephone set 50 is switched to the normal communication mode through radio waves (160). Then, the process ends. It is to be noted that either buzzer 107 or vibration generation device 109 preset by the user is selected as signaling an incoming call.

When determination is made that the message is not a command from departure recognition device 80 as a result of the determination of step 154, control proceeds to step 156 to determine whether the message is from approach recognition device 34. When this message is from approach recognition device 34, switch control unit 94 couples communication interface 92 with optical communication device 64, and disconnects radio communication device 96. At the time of calling corresponding to an incoming call, the setting is switched to force the usage of vibration generation device 109 irrespective of the general call setting by the user. Control switch unit 94 controls radio communication device 96 to suppress communication with the base station through radio waves, and allows communication only through a weak radio wave. Since communication through a weak radio wave is allowed, the passenger carrying this portable telephone set can receive the radio wave from departure recognition device 80 when getting off the vehicle. Departure recognition device 80 is installed at a position so that the distance between the portable telephone carried by the passenger and departure recognition device 80 is generally extremely small. Therefore, the operational mode of portable telephone set 50 can be switched even with a weak radio wave. The possibility of adversely affecting the human body or electronic equipment is extremely low since the radio wave is weak. The process ends after step 158.

When determination is made that the received communication is not from approach recognition device 34 at step 156, a process corresponding to the contents of the received communication is carried out, and the process ends. This process is not depicted in FIG. 9 for the sake of simplification.

It is apparent from the foregoing that portable telephone set 50 is switched to a communication mode using optical communication device 64 when portable telephone set 50 receives a command to switch to the optical communication mode from approach recognition device 34. Therefore, the radio wave issued from the portable telephone is little, if any, in contrast to the case where the normal communication using radio waves is carried out. The possibility of adversely affecting electronic equipment such as a pacemaker is extremely low. Since an onboard system 70 is installed at each vehicle to relay a call from an external source to a portable telephone present in the vehicle through optical communication using optical communication device 36, the advantageous function of the portable telephone, i.e. the advantage of immediately contacting a target party, is not degraded. As a disadvantage of optical communication, communication is not possible if the portable telephone is stored inside a handbag or the like. In this case, onboard system 70 functions as an answering phone for the portable telephone of the relevant telephone number to record a message from the calling party since onboard system 70 has a station management database 76 governing the telephone number of the portable telephone. The exit of a passenger carrying the relevant portable telephone is immediately sensed by departure recognition device 80, whereby the portable telephone initiates the general communication operation by radio waves and the recorded message is transmitted from onboard system 70 to the relevant telephone through radio. The user of the portable telephone can immediately confirm the message.

According to the system of the first embodiment, the portable telephone carries out telephone communication through optical communication, not radio communication, in the vehicle. The possibility of light adversely affecting electronic equipment is low, differing from radio waves. Therefore, the possibility of erroneous operation of electronic equipment such as the pacemaker caused by a portable telephone is reduced. Since optical communication is carried out in the vehicle, the advantage of a portable telephone can be effected. Even if the portable telephone is stored in a handbag so that optical communication cannot be carried out, a message from an external source can be recorded by the vehicle system. That message can be promptly provided to the passenger with the relevant portable telephone immediately when he/she is getting off the vehicle through radio waves. Therefore, the disadvantage of not using radio waves in the vehicle is solved.

Optical communication is employed in the vehicle in the system of the above-described embodiment. When the aim is to prevent the normal waves of a portable telephone in a vehicle from adversely affecting electronic equipment, a radio wave extremely weaker than the wave of the normal portable telephone with hardly no possibility of adversely affecting electronic equipment can be used for communication instead of optical communication. In this case, a device to carry out communication using such a weak wave is to be adapted instead of optical communication device 36 of the system of the first embodiment.

A radio wave of a frequency not used for a portable telephone such as a medium wave, a short wave, or of further higher frequency can be employed. In this case, a telephone set that has low possibility of adversely affecting the human body and electronic equipment is to be selected.

In carrying out optical communication in the above system, an incoming call for the portable telephone is notified only by vibration generation device 109 irrespective of the setting by the user. In the case where the present system is adapted to a theater, a cinema, a concert hall or the like, generation of a calling sound of the portable telephone can be suppressed so that the atmosphere during performance will not be spoiled. The possibility of annoying people in the neighborhood can be reduced while enjoying the advantage of a portable telephone. The portable telephone can be used without having to worry about bothering people in the neighborhood.

Second Embodiment

The system of the previous first embodiment allows conversation between an external source and a portable telephone in a vehicle through optical communication. However, some people may be annoyed by the conversation itself carried out by a portable telephone in a vehicle. Disabling communication per se through a portable telephone in a vehicle can be considered. However, it is not desirable to emit a noise wave in the vehicle for that purpose from the standpoint of adversely affecting electronic equipment. The system of the second embodiment of the present invention is directed to forcing the portable telephone to inhibit the normal conversation function when a passenger with a portable telephone boards the vehicle, and to restore the conversation function when he/she is getting off the vehicle.

Figure 10:
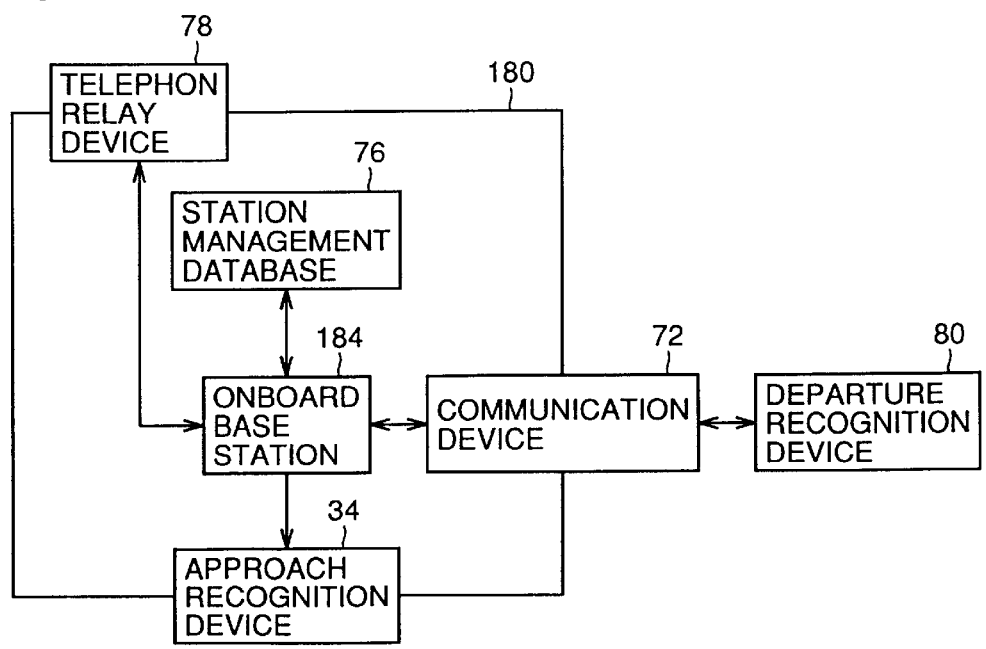
FIG. 10 is a block diagram of an onboard system used in a telephone regulation system according to a second embodiment of the present invention.

Referring to FIG. 10, an onboard system 180 of the second embodiment includes an onboard base station 184 to govern the number and the like of a portable telephone in a vehicle and an incoming call from an external source to a portable telephone present in the vehicle, an approach recognition device 34 similar to that used in the first embodiment, connected to onboard base station 184, a communication device 72 to relay communication between departure recognition device 80 and onboard base station 184, a station management database 76 similar to that used in the first embodiment to store the number of a portable telephone governed by onboard base station 184, a message from an external source, or the like, and a telephone relay device 78 connected to onboard base station 184.

Figure 11:
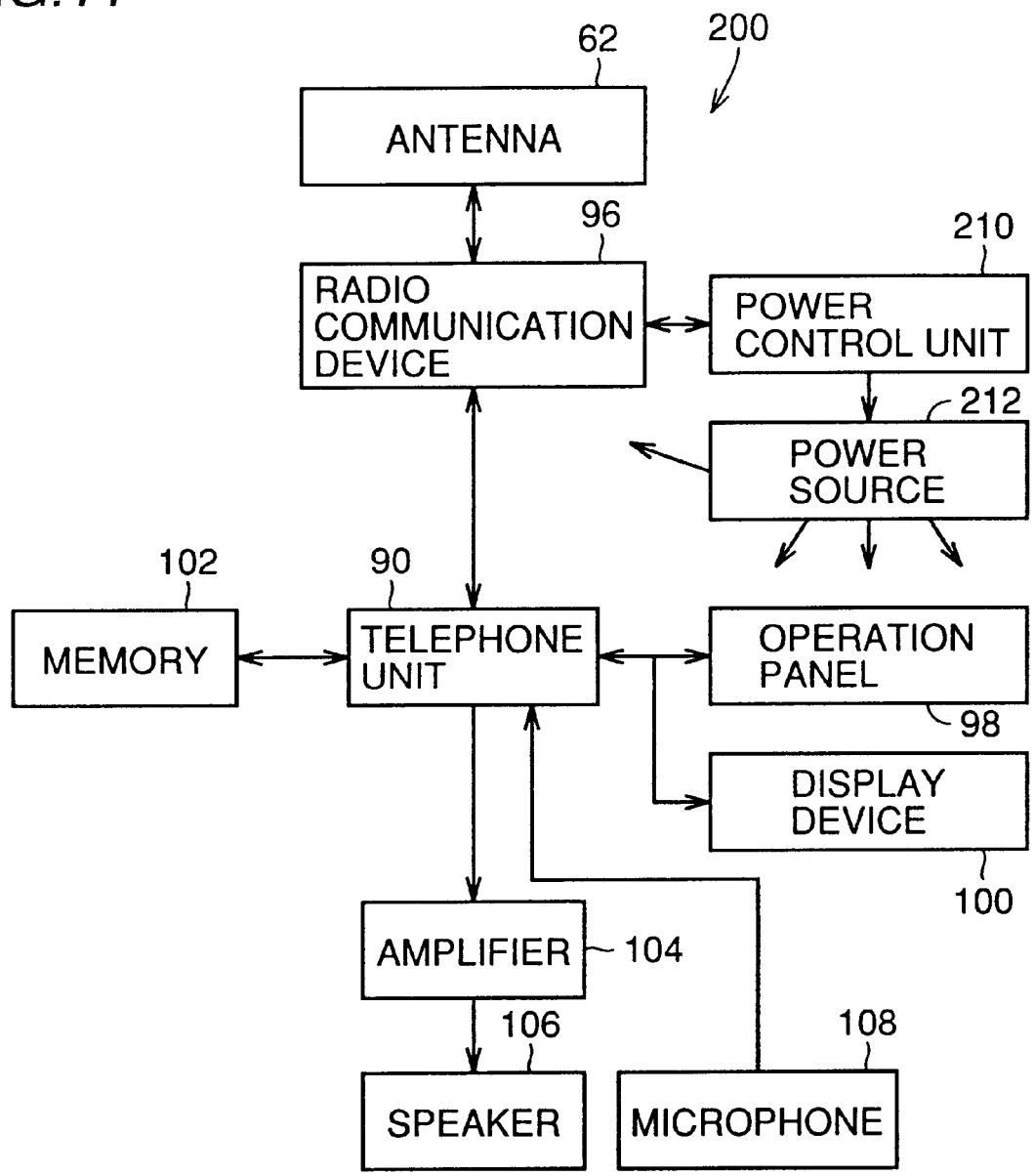
FIG. 11 is a block diagram of a portable telephone set used in the system of the second embodiment.

Referring to FIG. 11, a portable telephone 200 used in the system of the second embodiment differs from portable telephone set 50 of the first embodiment shown in FIG. 5 in that a radio communication device 96 is directly connected to telephone unit 90, absent of communication interface 92 and optical communication device 64, and that it includes a power control unit 210 instead of switch control unit 94 of FIG. 5. Power control unit 210 controls a power source 212 of portable telephone 200 according to a signal received from approach recognition device 34 or departure recognition device 80 via antenna 62 and radio communication device 96 to supply power only to a small portion of portable telephone 200 in the vehicle. The remaining elements of portable telephone 200 are similar to those of portable telephone set 50 of FIG. 5. In FIG. 11, components corresponding to those of FIG. 5 have the same reference characters allotted. Their functions and labels are also identical. Therefore, detailed description thereof will not be repeated.

As to the process carried out by onboard base station 184 shown in FIG. 10, the process when receiving an approach recognition signal of a portable telephone from approach recognition device 34 is identical to that shown in FIG. 6. The process when receiving a departure recognition signal of a portable telephone from a departure recognition device 80 is identical to that shown in FIG. 8. Therefore, detailed description thereof will not be repeated here.

Figure 12:
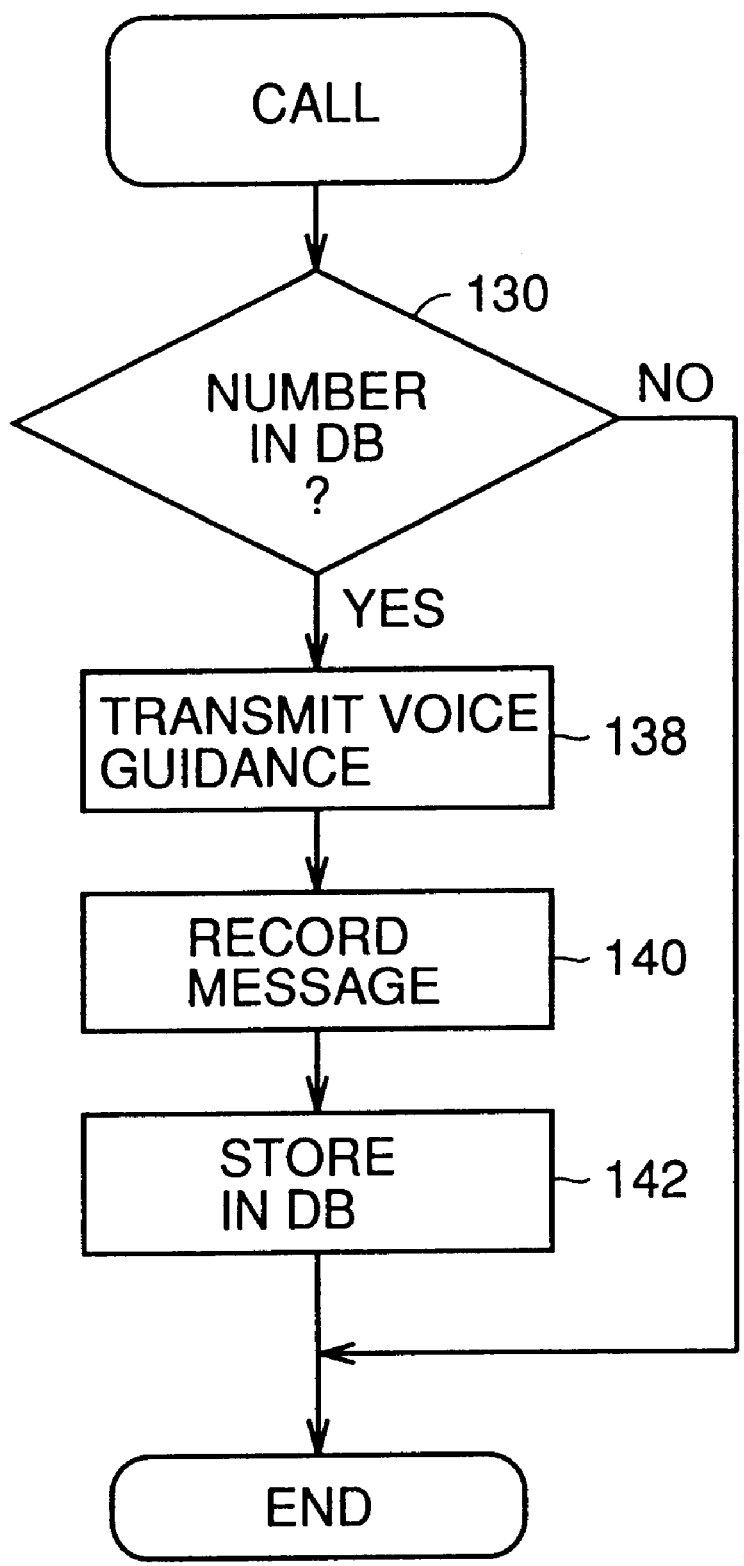
FIG. 12 is a flow chart of a process carried out by an onboard base station 184 of the system of the second embodiment in response to an external call.

FIG. 12 is a flow chart of the process executed by onboard base station 184 when there is a call from an external source. The process of FIG. 12 differs from the process of the first embodiment shown in FIG. 7 in that steps 132, 134 and 136 of FIG. 7 are absent. When the telephone number of a portable telephone corresponding to the call is present in station management database 76, a voice guidance is immediately transmitted (138). A message from the calling party is recorded (140), and stored in station management database 76 (142). The steps 132, 134 and 136 are not required since the portable telephone is not used in the vehicle as will be described afterwards.

Figure 13:
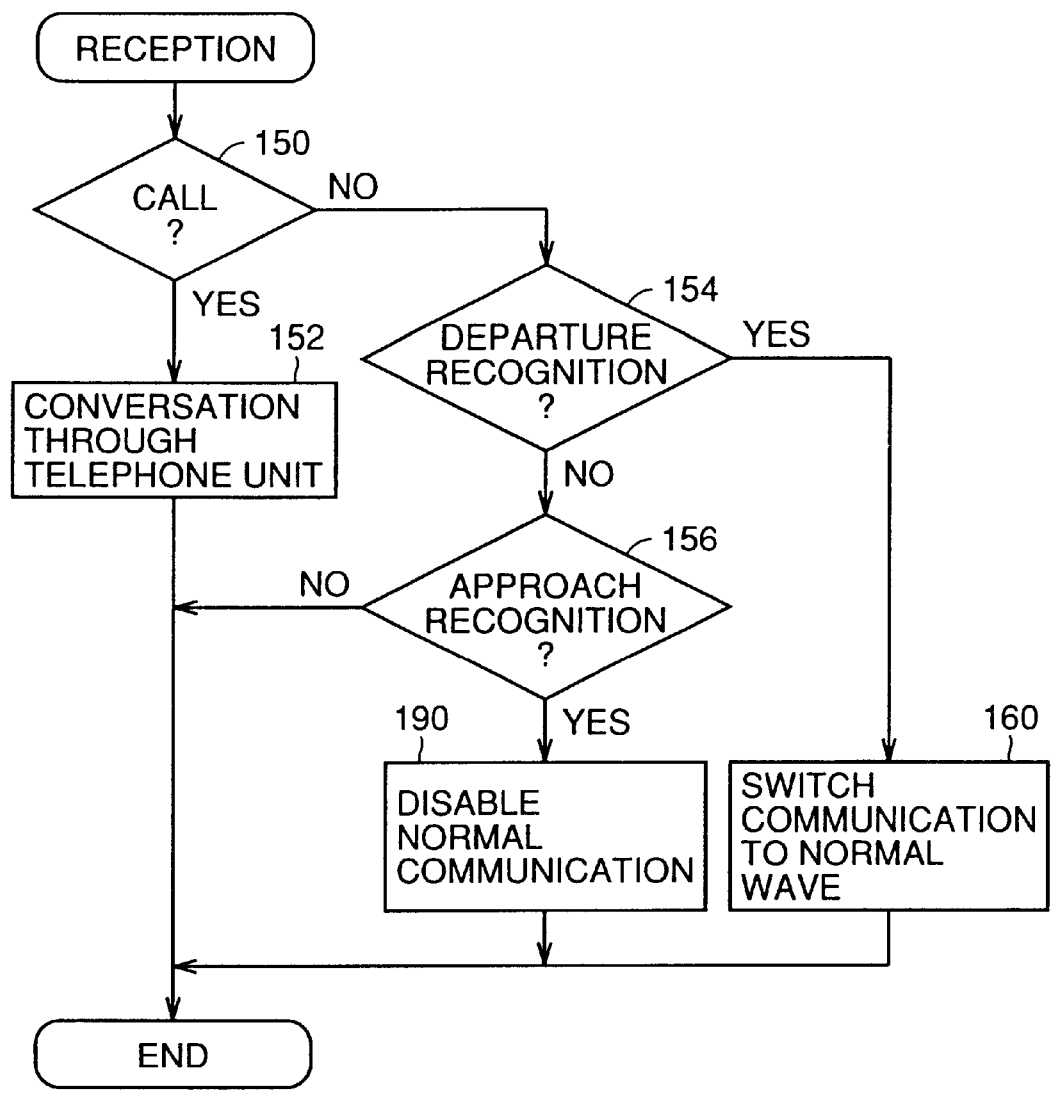
FIG. 13 is a flow chart of a process carried out by a portable terminal 200 used in the system of the second embodiment when a communication is received.

FIG. 13 shows the flow chart of a process when portable telephone 200 used in the system of the second embodiment receives a message or a communication. The process of FIG. 13 differs from the process of FIG. 9 carried out by portable telephone set 50 of the first embodiment in that a step 190 is included to disable normal communication by portable telephone 200 instead of the process of switching to optical communication of step 158 of FIG. 9. The remaining elements of FIG. 13 are similar to those of FIG. 9. Therefore, detailed description thereof will not be repeated here.

At step 190, power control unit 210 of FIG. 11 controls power source 212 so as to suppress power supply except for radio communication device 96 and power control unit 210. Power is supplied so as to allow communication only through a weak wave for radio communication device 96. As to power control unit 210, an operation similar to that of a normal one is carried out since a message is to be received from departure recognition device 80.

According to the system of the second embodiment, the entry of a passenger with a portable telephone is sensed by approach recognition device 34. The telephone number of that portable telephone is recorded in station management database 76. Portable telephone 200 responds to an approach recognition signal transmitted from approach recognition device 34 to attain a status in which normal communication cannot be carried out. The portable telephone becomes usable again when the passenger exits from the vehicle and a departure recognition signal is received from departure recognition device 80. When a call is issued from an external source to the telephone number of the portable telephone when the passenger is onboard, a voice guidance to the calling party is sent under control of onboard base station 184. A message from the calling party is recorded in station management database 76. This message is transmitted to the portable telephone from onboard base station 184 via telephone relay device 78 when the relevant telephone becomes operable, as in the case of the first embodiment.

In the system of the second embodiment, normal communication through the portable telephone of the passenger is disabled when the passenger comes onboard. Communication is allowed after the passenger has disembarked. In the vehicle, a radio wave as a medium of normal communication of a portable telephone will not be used. Therefore, the possibility of adversely affecting electronic equipment in the vehicle is low, as in the case of the first embodiment. Although the user of the portable telephone may feel some inconvenience in comparison with the first embodiment since normal communication cannot be effected in the vehicle, the inconvenience is alleviated since a call from an external source, if any, is promptly notified to the user of the portable telephone after the user has exited the vehicle. Passengers in the neighborhood will not be bothered by a conversation through a portable telephone since conversation itself is disabled in the vehicle.

Third Embodiment

In the first and second embodiments, a voice guidance is sent to the calling party to record a message when there is a call when normal communication through the portable telephone cannot be carried out in the vehicle. This function is not necessarily essential to the present invention. In order to avoid undesirable influence by the waves of the portable telephone in the vehicle, the normal function of a portable telephone is to be inhibited in the vehicle and restored when exiting.

To this end, a function is to be provided using approach recognition device 34 and departure recognition device 80 to inhibit the normal communication function in response to an approach recognition message sent from approach recognition device 34 and restoring the normal conversation function in response to a departure recognition message sent from departure recognition device 80.

The structure of approach recognition device 34 and departure recognition device 80 will be obvious to those skilled in the art since it is only required to transmit a typical message through a weak wave.

As a portable telephone, a phone similar to portable telephone 200 of the second embodiment shown in FIG. 11 is to be used.

According to the present system, a portable telephone when present in a vehicle cannot be used and communication cannot be carried out even when there is a call from an external source during that period. This is inconvenient for a user of the portable telephone. However, there is the advantage of avoiding adverse affect of the portable telephone with a simple structure of the system since only approach recognition device 34 and departure recognition device 80 are to be used as the facility in addition to the portable telephone.

Fourth Embodiment

In the system of the previous first embodiment, only optical communication is used in the vehicle. Optical communication is disadvantageous in that it cannot be carried out if the portable phone is stored in a handbag or the like. When there is no response to a call through optical communication to a portable telephone in a vehicle in the system of the first embodiment, a message from an external source is recorded. However, it is preferable to immediately effect a call corresponding to an incoming call to make good use of the advantage of a portable telephone. The system of the fourth embodiment is characterized in that an incoming call is immediately effected.

Identification can be made whether a portable telephone of a relevant telephone number is present in the vehicle by using station management database 76. By providing a plurality of optical communication devices 36 in the vehicle and also a device to carry out communication using waves, a call can be effected to the portable telephone even with an extremely weak wave. Thus, the system of the present fourth embodiment effects calling through an extremely weak wave when there is an incoming call to a portable telephone in the vehicle from an external source. The user will generally pull out a portable telephone, even if it is stored in a handbag or the like, when there is a call. Then, communication through light is allowed. In the case where there is a response to a call through a weak wave, the mode is switched to optical communication to carry out conversation. The structure thereof will be described in detail hereinafter.

Figure 14:
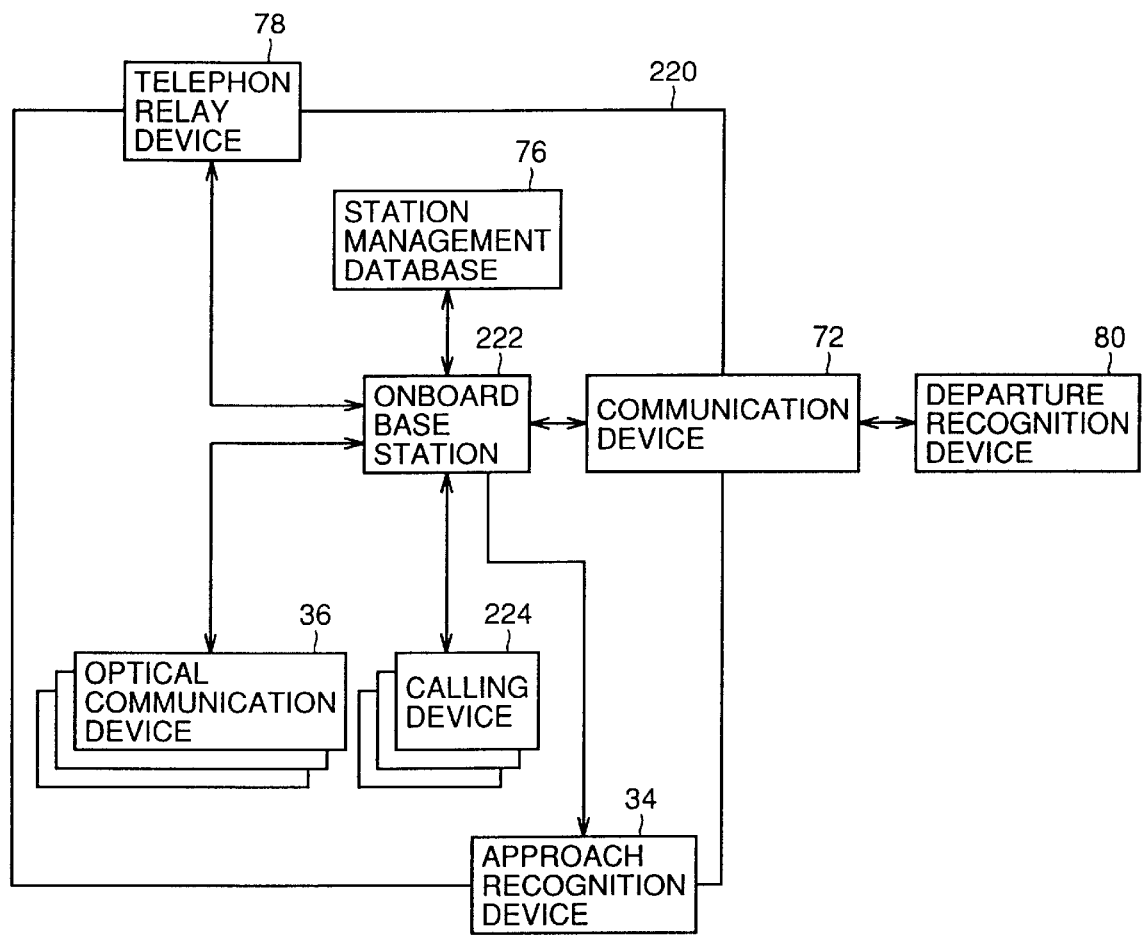
FIG. 14 is a block diagram of an onboard system 220 according to a fourth embodiment of the present invention.

Referring to FIG. 14, an onboard system 220 of the system of the fourth embodiment differs from onboard system 70 of FIG. 4 in that a plurality of calling devices 224 to send a call to a portable telephone in the vehicle through a weak wave is newly included, and that an onboard base station 222 is provided instead of onboard base station 74. Onboard base station 222 issues a call through a weak wave by calling device 224 when there is an incoming call from an external source to a portable telephone within the vehicle. When there is a response from the portable telephone, the conversation is relayed through optical communication using optical communication device 36.

Figure 15:
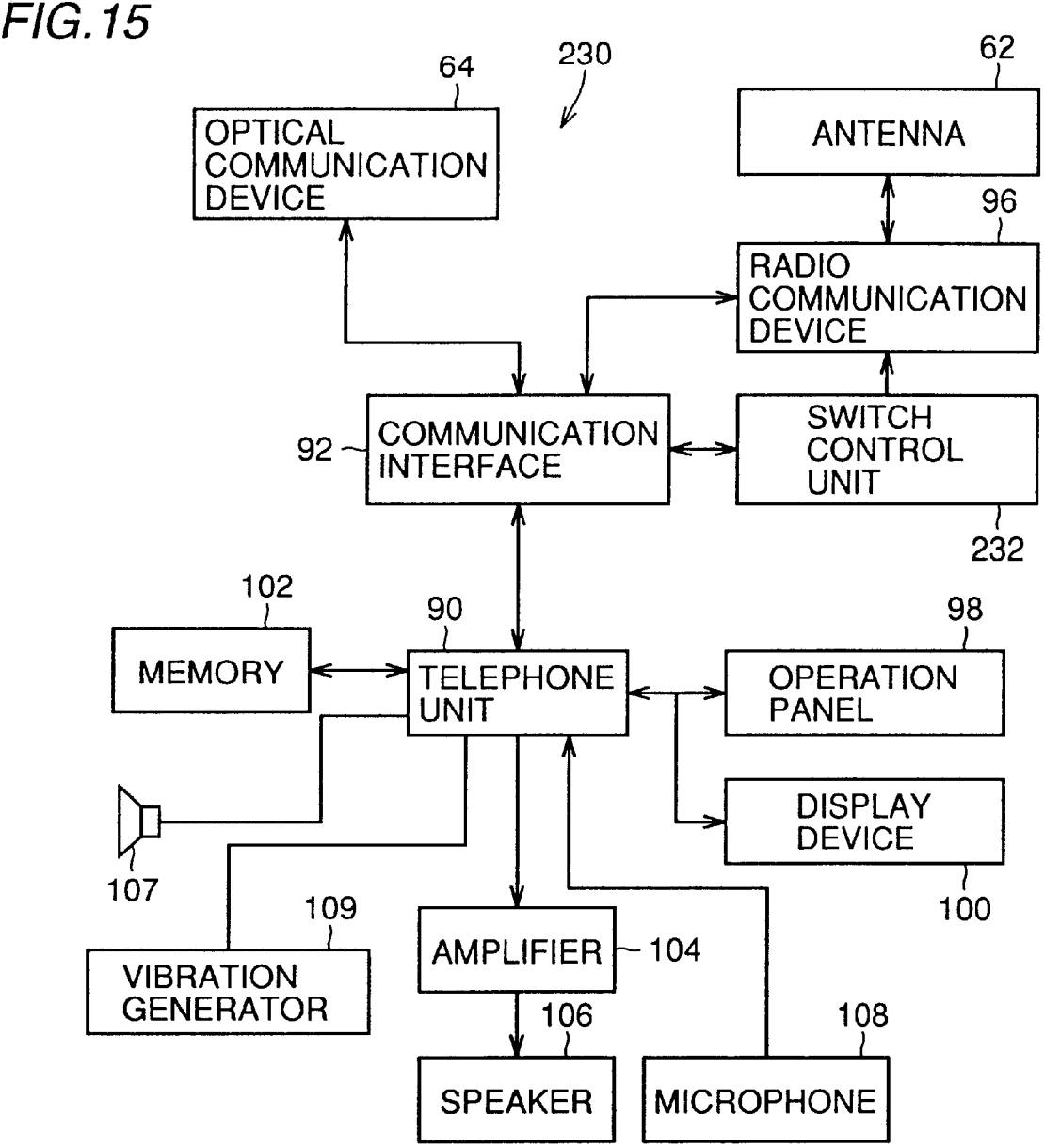
FIG. 15 is a block diagram of a portable telephone 230 of the fourth embodiment.

Referring to FIG. 15, a portable telephone 230 used in the system of the fourth embodiment includes a switch control unit 232 instead of switch control unit 94 of portable telephone set 50 of FIG. 5. Switch control unit 232 has the function to respond to a call through a weak wave via radio communication device 96 and antenna 62, and also to switch communication interface 92 so as to carry out optical communication using optical communication device 64. In FIG. 15, components corresponding to those shown in FIG. 5 have the same reference characters allotted. Their labels and function are identical. Therefore, detailed description thereof will not be repeated here.

In the system of the fourth embodiment, the process carried out when onboard system 220 receives notification of a telephone number of a portable phone of a passenger onboard from approach recognition device 34 and when onboard system 220 receives notification of a telephone number of a portable telephone of an alighting passenger from departure recognition device 80 are similar to the processes shown in FIGS. 6 and 8, respectively.

Figure 16:
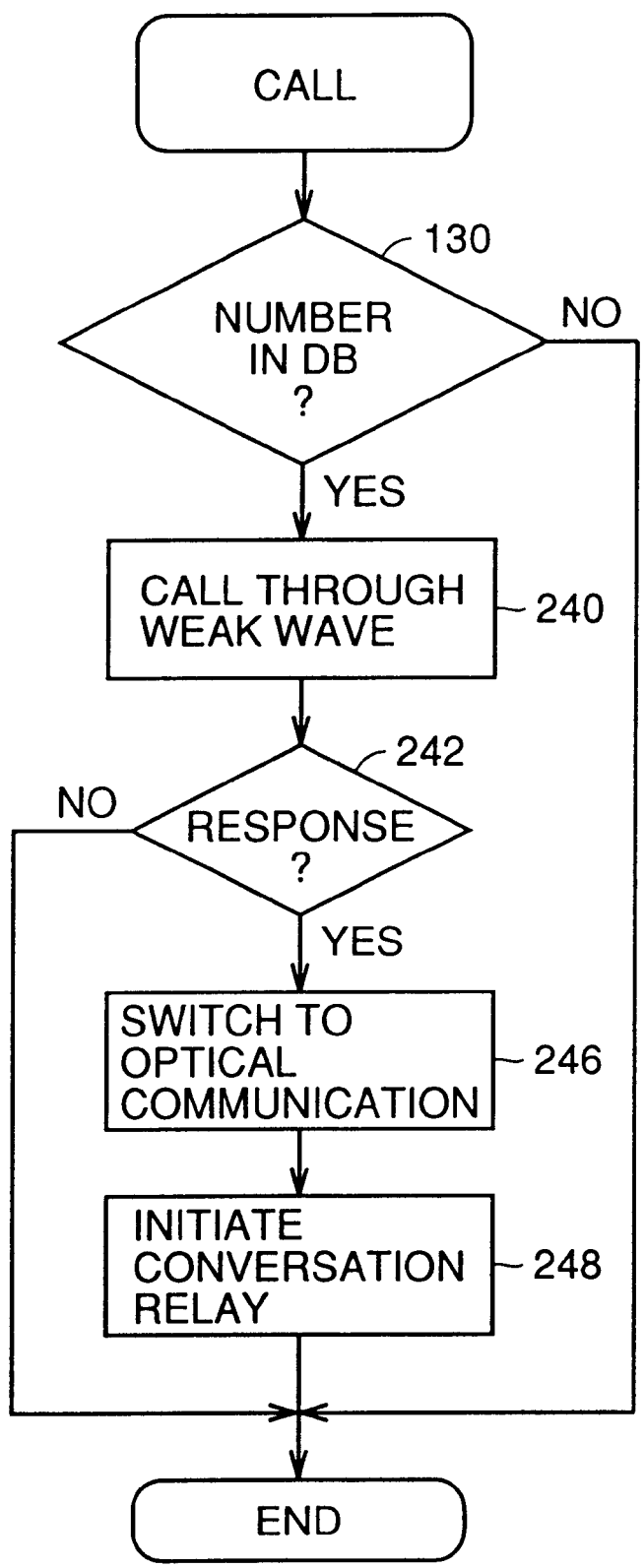
FIG. 16 is a flow chart of a process carried out when there is an external call in onboard system 220 of the fourth embodiment.

The operation of onboard system 220 when there is a call to a portable telephone whose telephone number is recorded in station management database 76 will be described with reference to FIG. 16. Upon receiving an external calling signal, determination is made whether the telephone number in the received signal is recorded in station management database 76 (130). When the telephone number is not recorded in station management database 76, the process directly ends since the target telephone number is not present in the vehicle.

When the relevant telephone number is stored in station management database 76, a call is issued to the portable telephone through a weak wave using calling device 224 (240). Determination is made whether there is a response to this call (242). When there is no call, the process directly ends (242). Since the system of the present embodiment employs a radio wave for calling, the possibility that calling is disabled is low in comparison with the case where calling is effected through optical communication. The possibility is high that the portable telephone of the relevant telephone number is not present in the vehicle when there is no response. Therefore, unlike the first embodiment, a message is not recorded. Alternatively, the system may be modified to allow message recording.

When there is response from a portable telephone at step 242, the communication mode is switched to the optical communication mode (246). The process of relaying a conversation using optical communication device 36 is initiated (248). Then, the process ends.

Figure 17:
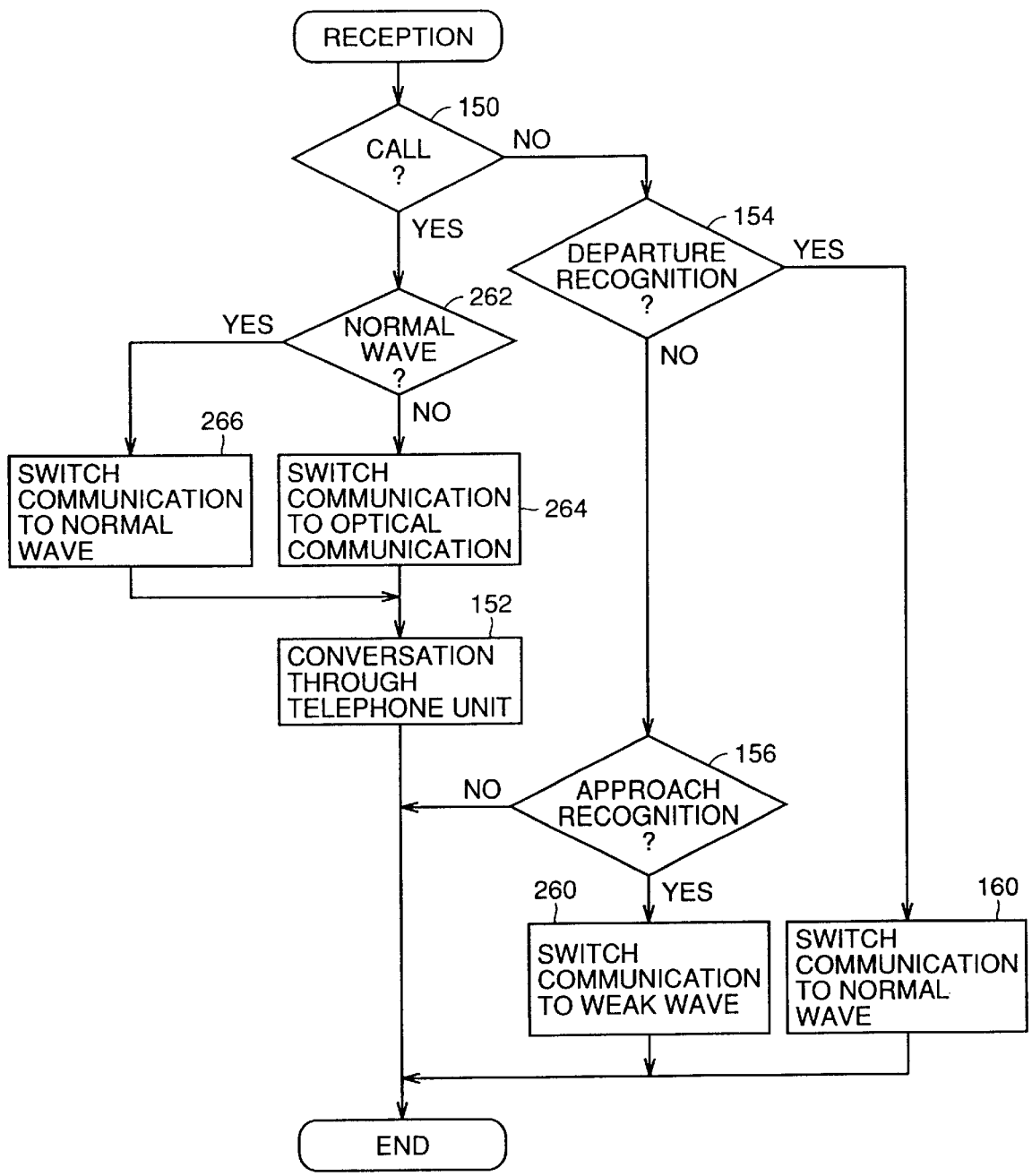
FIG. 17 is a flow chart of a process carried out when external communication is received in portable telephone 230 of the fourth embodiment.

Referring to FIG. 17, portable telephone 230 used in the fourth embodiment carries out a process set forth in the following when a communication is received from an external source. First, determination is made whether the received communication is a call or not (150). If the communication is a call, determination is made whether it is a call through a normal wave (262). If the call is through a normal wave, communication is switched to the normal communication using radio waves (266). Conversation through the telephone unit is carried out (152). When determination is made that it is not a normal call, i.e. a call through a weak wave, at step 262, the mode is switched to the communication mode using optical communication device 36 (264). Conversation by the telephone unit is carried out (152).

When determination is made that the received communication is not a call at step 150, control proceeds to step 154 to determine whether the received communication is a command recognizing departure from departure recognition device 80. When the communication is a departure recognition command, the mode is switched to that of a normal radio wave (160). Then, the process ends. If the received communication is not a departure recognition command, control proceeds to step 156 to determine whether the communication is an approach recognition command from approach recognition device 34. In the case where the received communication is an approach recognition command, communication is switched to that of a weak wave (step 260). Then, the process ends.

When a user with a portable telephone gets on the vehicle, portable telephone 230 attains a communication mode using only a weak radio wave in response to an approach recognition command from approach recognition device 34. Accordingly, a call using a weak radio wave is allowed by calling device 224 in the vehicle. Differing from a call by optical communication, the possibility of not being able to respond to a call is reduced.

When there is an incoming call from an external source to a relevant portable telephone if the user is in the vehicle, a call is issued through a weak wave from calling device 224. In response to this call by the portable telephone, communication is switched to optical communication at both onboard system 220 and portable telephone 230. Conversation through optical communication is relayed. The user will generally maintain the portable telephone at a position where optical communication is possible. Therefore, conversation of high audio quality using optical communication can be carried out. Since a radio wave is not used for the conversation, there is no possibility of adversely affecting other electronic equipment by the radio wave.

Upon exit of the user from the vehicle, the portable telephone of that user receives a departure recognition command from departure recognition device 80. In response to this command, portable telephone 23 switches the communication mode to a mode using normal radio wave from a weak wave. Accordingly, conversation using a radio wave identical to that of a normal case is allowed outside the vehicle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable telephone terminal device comprising:

first communication means for carrying out communication using a wireless radio wave, second communication means for carrying out communication using light, a telephone unit, switch means for selectively coupling one of said first communication means and said second communication means with said telephone unit in response to a command received via said first communication means, and means for setting said first communication means at an operation mode allowing reception of only a weak wave upon receiving a predetermined first command via said first communication means, and setting said first communication means at an operation mode allowing conversation through said wireless radio wave upon receiving a predetermined second command via said first communication means.

2. A portable telephone terminal device comprising:

a telephone circuit, a radio communication device, an optical communication device, a communication interface selectively coupling one of said radio communication device and said optical communication device with said telephone circuit in response to a command received via said radio communication device, and a switch control circuit setting said radio wave communication device at an operation mode capable of receiving only a weak wave upon receiving a predetermined first command via said radio communication device, and setting said radio communication device at an operation mode capable of conversation through a radio wave having power greater than the power of said weak wave upon receiving a predetermined second command via said radio communication device.

* * * * *